United States Patent [19]

Gunderson

[11] 3,933,141

[45] Jan. 20, 1976

[54] ZERO CROSSING CIRCUIT FOR ELECTRONIC IGNITION SYSTEM

[75] Inventor: Philip D. Gunderson, Arlington Heights, Ill.

[73] Assignee: Motorola, Inc., Chicago, Ill.

[22] Filed: Mar. 7, 1974

[21] Appl. No.: 449,185

[52] U.S. Cl. ............................. 123/148 E; 307/310
[51] Int. Cl.² ........................................... F02P 1/00
[58] Field of Search ................. 123/148 E, 148 OL; 307/310

[56] References Cited
UNITED STATES PATENTS

| | | | |
|---|---|---|---|
| 3,517,260 | 6/1970 | Oishi | 123/148 E |
| 3,585,511 | 6/1971 | Schatter | 307/310 |
| 3,701,015 | 10/1972 | Dittman | 324/174 |
| 3,721,968 | 3/1973 | Gee | 324/174 |

OTHER PUBLICATIONS

Millman & Taub, "Pulse, Digital and Switching Waveforms," 1965, page 191, (McGraw—Hill).
R. J. Wilder, "Design Techniques for Linear Integrated Circuits" from *Microelectronics*, Nov. & Dec. 1966.

*Primary Examiner*—Charles J. Myhre
*Assistant Examiner*—Paul Devinsky
*Attorney, Agent, or Firm*—James W. Gillman; Donald J. Lisa

[57] ABSTRACT

A temperature controlled ignition circuit includes a high voltage coil, ignition circuitry connected thereto and a magnetic generator for controlling the operation of the ignition circuitry and the production of a high voltage at the coil. A transistor in the ignition circuitry is connected at its base to one terminal of the magnetic generator and is biased for full conduction upon provision of some predetermined positive voltage by said generator. A second transistor having operating characteristics similar to those of the first is connected to operate as a diode; i.e. with the base electrode being connected to the collector electrode thereof. The second transistor is connected between ground potential and the other terminal of the generator and is biased into forward conduction to maintain a reference voltage at the other terminal of the generator substantially equal to that at the base-emitter junction of the first-mentioned transistor such that the average current densities of both transistors are substantially equal. Thus, any change in the reference potential at the base-emitter junction of the first transistor due to temperature will be compensated for by a similar change in the reference potential at the other terminal of the generator so that the first-mentioned transistor operates upon application of the predetermined voltage by the generator despite temperature and/or power supply voltage changes. The predetermined voltage corresponds substantially to the zero crossovers of the generator output. The dynamic impedance of the second transistor is lower than the dynamic impedance of a conventional diode and as such does not raise the impedance at the base of the first transistor as would a conventional diode.

4 Claims, 2 Drawing Figures

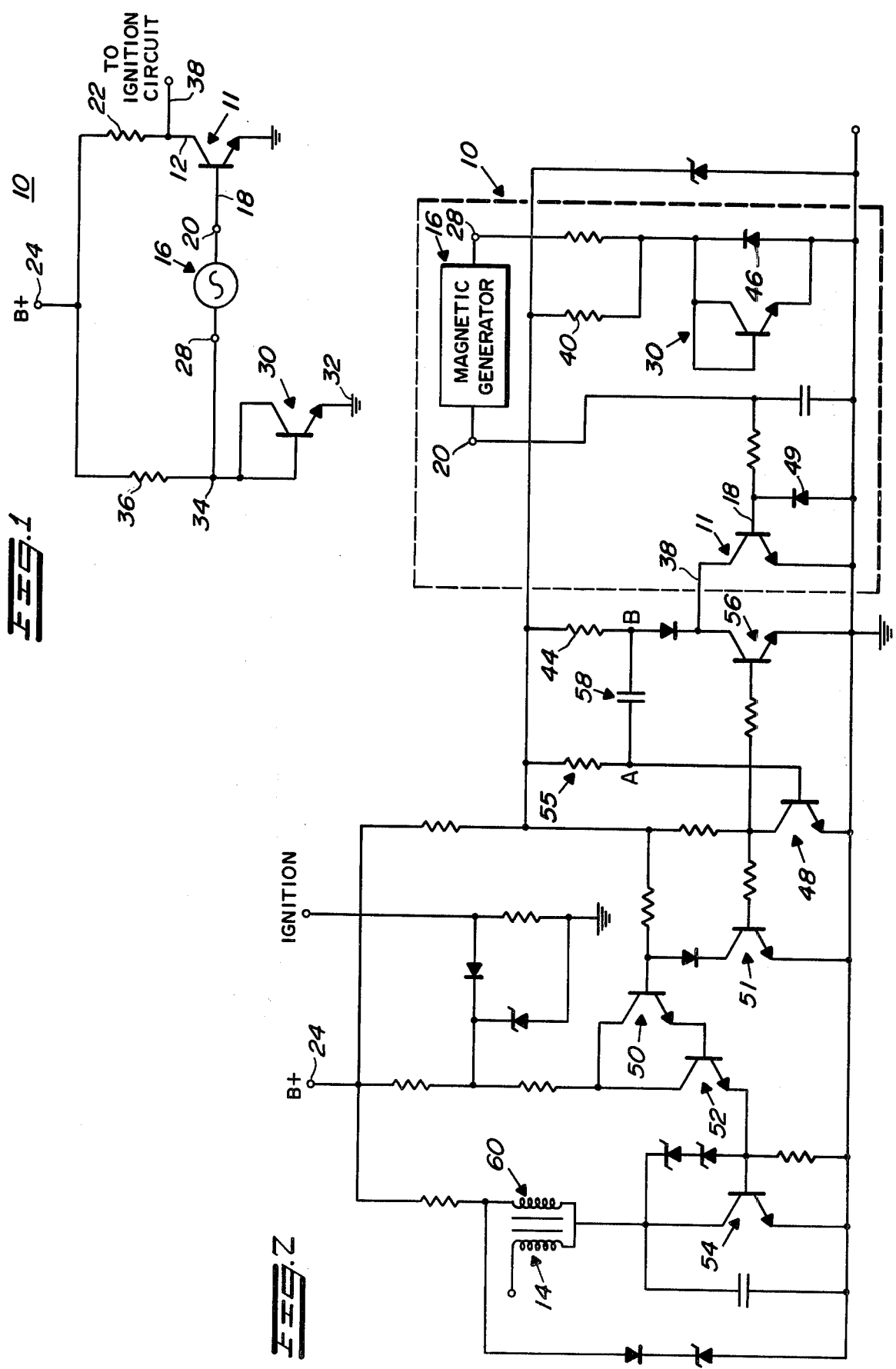

ZERO CROSSING CIRCUIT FOR ELECTRONIC IGNITION SYSTEM

BACKGROUND

This invention relates generally to zero crossing detector circuits and more particularly to such a circuit usable in conjunction with an electronic ignition system for controlling the spark timing thereof.

In an electronic type ignition system it is desirable to produce a spark at the spark plugs of the system at substantially fixed times which vary only minimally. In these systems the magnetic generator in the distributor normally provides a voltage varying from some positive amplitude to some negative amplitude; different magnetic generators producing different wave shapes. The voltage provided by the magnetic generator conventionally renders a transistor or the like semi-conductor component conductive which in turn operates other circuitry to produce the spark.

The biasing voltage required to render a transistor conductive varies with temperature so that in some instances the transistor requires a greater voltage than in others to become biased into conductivity. When the latter occurs, the spark is not produced at the same time relative to the movement of the magnetic generator and as such the timing of the engine with which the ignition system is being used is changed.

While it is known in the art to temperature control a transistor by providing in the biasing circuit a semi-conductor diode fabricated of a material similar to that of the transistor which maintains the voltage at the base-emitter junction of the transistor substantially constant, the dynamic impedance of the diode is higher than the dynamic impedance of a diode connected transistor as is provided in the present invention and, as such, raises the series impedance at the base of the controlled transistor resulting in poorer noise immunity. Additionally, the thermal tracking characteristics of a diode do not match the thermal characteristics of the controlled transistor as well as a diode connected transistor, as is provided in the present invention, resulting in inferior insensitivity to voltage variations caused by temperature changes and power supply fluctuations.

SUMMARY

Accordingly, it is a primary object of the present invention to provide a new and improved zero crossing circuit for electronic ignition systems.

It is another object of the present invention to provide a new and improved electronic ignition system with improved temperature tracking, insensitivity to power supply voltage variations and noise immunity.

It is another object of the present invention to provide circuitry of the above described type which is relatively simple, yet reliable in operation.

Briefly, a preferred embodiment of the temperature controlled ignition circuit according to the invention includes high voltage production means, such as, for example, a coil, which is connected through electronic ignition circuitry to a magnetic generator or sensor device in a distributor. A transistor in the ignition circuit is connected at its base to one terminal of the generator device and is connected to be biased to a more conductive state when some positive voltage is provided by the generator thereto. A second transistor of the same type as the last-mentioned transistor is coupled between the other terminal of the generator and ground potential. The transistor is connected to operate similar to diode, but has a lower dynamic impedance characteristic and as such does not raise the impedance at the base of the controlled transistor, as would an ordinary semi-conductor diode.

The controlled transistor is biased so that any positive voltage applied by the controlled magnetic generator at the base thereof causes the transistor to become fully conductive. The diode connected transistor compensates for any temperature change to maintain the bias voltage at the other terminal of the magnetic generator constant with respect to the reference voltage level at the base of the controlled transistor such that substantially at the predetermined crossover points reached by the generator at its one terminal, the controlled transistor is turned on and off, respectively. Thus, a consistent turn on of the controlled transistor is provided despite temperature changes.

DESCRIPTION OF THE DRAWING

In the drawing:

FIG. 1 is a simple schematic diagram of the temperature controlled portion of the ignition circuit according to the invention; and FIG. 2 is a schematic diagram of a preferred embodiment of the electronic ignition system according to the invention.

DETAILED DESCRIPTION

Referring now to the drawing in greater detail wherein like numerals have been employed throughout the various views to illustrate similar components, there is shown in FIG. 1 a simple schematic diagram of the temperature controlled portion 10 of the ignition circuit according to the invention. In FIG. 1, transistor 11 provides an output voltage at its collector electrode 12 which, as will be explained hereinafter, controls the operation of the remainder of the ignition circuit to produce a high voltage in the coil 60 and a resultant spark at a spark plug connected at terminal 14 (See FIG. 2) of the ignition circuit.

A magnetic generator 16 provided in the distributor (not shown) of the system and represented as an AC generator in FIG. 1, is connected to the base electrode 18 of the transistor 11 at one terminal 20. The magnetic generator provides a voltage varying from some positive amplitude to some negative amplitude. In the case of the transistor 11, the latter is also coupled at its collector electrode 12 through a resistor 22 to a DC power supply 24. The power supply can take the form of a battery, a rectified and filtered alternator output, etc., in a motor vehicle. This resistor 22, in conjunction with the particular transistor 11 is chosen so that the transistor 11 at the zero crossover point of the generator is ideally partially conductive and becomes more conductive when any positive-going voltage is applied at the base 18 of the transistor 11. In practice, 0.5 volts is required at the base for turn on. Thus, as the voltage supplied by the magnetic generator 16 goes through the zero crossover point from a negative value to a positive value, transistor 11 will be turned on and as the voltage supplied by the magnetic generator 16 goes through the zero crossover point from a positive value to a negative value, transistor 11 will be turned off.

A change in temperature of the transistor 11 will cause its operating point to vary. Thus, the turn on thereof may change and not occur at the same time over successive operations; i.e. when 0.5 volts is applied at the base thereof, and as such, change the timing of the spark produced at the spark plugs of the ignition circuit. To compensate for this, a transistor 30 of the same type as transistor 11; i.e. fabricated of the same material, etc., is connected in a diode configuration (See FIG. 1) and is provided between the terminal 28 of the magnetic generator and ground potential 32. The transistor 30 as shown has its base and collector electrodes coupled together and connected at junction 34 to the terminal 28 of the magnetic generator. The emitter electrode is connected to ground potential 32. The transistor may also be connected with its base and emitter electrodes tied together and coupled electrically to terminal 28 and with the collector electrode connected to ground potential.

The temperature compensation transistor 30 is also connected at its base-collector electrode through a resistor 36 to the DC power supply 24. The resistor 36 is chosen to provide a specified current from the power supply to forward bias the transistor 30 at all times. This in turn, provides a specific voltage, herein also 0.5 volts, at the junction 34 and so also at the terminal 28 of the magnetic generator 16.

With the current density of transistor 30 being the same as the average current density of the controlled transistor 11, all biases are proper to provide an output at 38 at substantially the zero crossing time of the magnetic generator. The proper current density can be achieved by the proper combination of resistor 36, the base-emitter junction area of transistor 30, resistor 22 and the base-emitter junction area of transistor 11. Accordingly, at the zero crossing time, the bias on transistors 11 and 30 is such that preferably the output at 38 is at the midpoint between ground and B+, i.e., at zero crossing time transistor 11 is already half on and that transistor is highly sensitive to the changing generator output signal, a small change in the generator output signal at terminal 20 producing a large change in the output at collector junction 38.

The particular manner in which the transistor 30 is connected in the circuit is important in achieving the zero crossing temperature tracking characteristic and in providing a lower dynamic impedance to ground which lowers the series impedance to the base of the controlled transistor 11. This feature improves noise immunity. It should be noted that the lower dynamic impedance, and improved noise immunity, temperature tracking, and the insensitivity to power supply voltage variations would not be achieved with a conventional semi-conductor diode of a similar material as transistor 11 connected in place of the diode-connected transistor 30.

Looking now to the preferred embodiment of the ignition circuit in FIG. 2, the temperature compensation portion 10 of FIG. 1 including the controlled transistor 11 and temperature compensation transistor 30 is shown therein in the dashed box. Resistor 40, is provided to serve the purpose of resistor 36 and resistor 44, with other loads (55 provides some loading), performs the function of resistor 22. Diodes 46, 49 are provided to cause the current load on generator 16 to be approximately equal for both positive and negative voltages from the generator. During large positive swings of generator voltage current flows through diode 46 and transistor 11. During large negative swings of generator voltage current flows in the opposite direction through diode 49 and transistor 30.

Since the transistor ignition circuit can in fact take a variety of forms, a detailed description of all the elements of the preferred embodiment of the ignition circuit will not be discussed herein. In the operation of the preferred ignition circuit embodiment, when the magnetic generator 16 provides some positive going voltage, transistor 11 is biased into conduction. An output voltage is provided at output 38 thereof to in turn operate transistor 48 to an off condition. The turn off of transistor 48 causes transistor 51 to be turned on and the Darlington coupled transistors 50, 52 to be switched off along with transistor 54 coupled thereto. When the latter transistor is turned off, a voltage transient is produced in the ignition coil 60 of the system to provide a spark at electrode 14 whereat a spark plug (not shown) is to be connected. A capacitor 58 couples the base of transistor 48 at A to the collector of transistor 56 at B. With transistor 11 turned off, transistor 48 is biased on through resistor 55 to the bias voltage 24. The base-emitter voltage of transistor 48 clamps the voltage at the A side of capacitor 58. The B side of capacitor 58 rises in voltage as the capacitor charges through resistor 44, thus creating a net positive charge on the B side of capacitor 58. When transistor 11 is turned on, point B is clamped low, as is point A since the voltage cannot change instantaneously across the capacitor 58. This turns transistor 48 off causing its collector voltage to increase which turns on transistor 56. Now both transistors 56 and 11 are on. The voltage at A rises towards the bias voltage 24 as capacitor 58 charges through resistor 55, at a rate determined by the RC time constant of the circuit, until the voltage at A reaches a point to turn transistor 48 on and transistor 56 off. Transistor 11 stays on until the generator 16 output swings negative which determines the point at which the B side of capacitor 58 begins to charge through R44 and, consequently the amount of the net positive charge capacitor 58 will obtain by the time T11 is switched back on. That net positive charge determines the negative level to which the base of 48 is driven when T11 goes on, and consequently, the length of time that T48 stays off while capacitor 58 is being charged through R55 until T48 is turned back on. During the latter charge-up period of capacitor 58, which is the period during which discharge of the ignition coil is occuring, transistor 56 is on and maintains transistor 48 in an off condition in the event transistor 11 should be prematurely turned off due, for example, to a negative noise voltage spike applied to the base of transistor 11. Thus transistor 56 ensures that the full duration of spark is supplied to the spark plug at electrode 14 for good combustion of the gasoline in the internal combustion engine with which the ignition circuit is used. The result is a constant percent dwell output at operating rpm, namely, the collector voltage of transistor 48 is high for a predetermined percentage of the entire cycle.

As descried heretofore, the diode connected transistor 30 coupled electrically between ground potential and terminal 28 of generator 16, compensates for temperature changes in transistor 11. The transistor 30 maintains the terminal 28 of generator 16 at a reference potential substantially equal to that required to switch transistor 11 despite temperature changes which vary the operating point of transistor 11. Thus, the time of switching of transistor 11 is maintained at the zero voltage crossing point of the output voltage provided by the generator 16.

The diodeconnected transistor 30, unlike a conventional semi-conductor diode has thermal tracking characteristics which will better match the thermal characteristics of the controlled transistor 11 and will provide improved insensitivity to power supply voltage variations. Moreover, because of the lower dynamic impedance of transistor 30 the noise immunity to transistor 11 is improved as well.

While the activation of the ignition circuit by the magnetic generator 16 has been illustrated heretofore as occuring at substantially the zero crossing point, it is to be understood that the voltage level can be changed to some predetermined positive or negative level and still fall within the scope of the present invention.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. An electronic ignition system comprising an ignition coil for providing a high voltage output, ignition circuit means connected to said coil, and ignition timing generator means having first and second output terminals and operable to provide an output voltage varying in amplitude from some positive to some negative voltage, said generator means being connected at the output terminals thereof to said ignition circuit means for initiation of the operation thereof, said ignition circuit means including temperature compensation means for detecting the zero crossing point of said generator means and including a first transistor having predetermined operating characteristics and input, output and common electrodes, the input of said transistor being connected to the first output terminal of said generator means, the common electrode of said first transistor being directly connected to a fixed reference potential, and biasing means having predetermined values connected to said first transistor for establishing therein a first predetermined current density when the generator output at the first terminal thereof is zero, and cooperating with the first transistor characteristic to establish at that current density the switching voltage at the input of said first transistor, said transistor being rendered conductive upon application at said input electrode of said switching voltage by said generator means to produce an output between said output and common electrodes of said first transistor for operating said ignition circuit means, said biasing means including a second transistor having operating characteristics similar to that of said first transistor and having input, output and common electrodes, said input and output electrodes being coupled together causing said transistor to operate effectively as a diode and being coupled to the second output terminal of said generator means, the common electrode of said second transistor being connected to the reference potential, said biasing means biasing said second transistor into conduction to establish therein a second predetermined current density substantially equal to the first predetermined current density when the generator output at the first terminal thereof is zero in order to maintain the second output terminal of said generator means at a voltage level substantially the same as the switching voltage established at the input of said first transistor and to maintain said first transistor in a partial state of conduction when the output voltage of said generator means at the first terminal thereof is zero, the switching voltage at the input of said first transistor changing with temperature or supply voltage variations and the voltage level at the second output terminal of said generator means being maintained in accordance therewith, said switching voltage of said first transistor substantially corresponding to the zero crossing point at the first output terminal of said generator means when said generator is going from a negative to a positive output to ensure said first transistor is turned on upon said generator means reaching its zero crossing point despite said temperature changes and said supply voltage variations, said second transistor having a lower dynamic impedance than a conventional diode to maintain a low impedance at the input of said first transistor and further comprising said biasing means having predetermined values establishing the switching voltage at a level substantially corresponding to the zero crossing point at the first output terminal of said generator means when said generator is going from a positive to a negative output to ensure said first transistor is turned off upon said generator means reaching its zero crossing point despite said temperature changes and said supply voltage variations.

2. The electronic ignition system as claimed in claim 1 further comprising a first housing in which the generator means is housed and supported in operative relation with the engine crankshaft and a second housing remotely located from the first housing and in which the ignition circuit including the first and second transistors and the biasing means is housed.

3. The electronic ignition system as claimed in claim 1 wherein the high voltage of the ignition coil is produced in response to the output of the generator means at the first terminal changing from negative to positive and the first transistor being turned on.

4. An electronic ignition system as claimed in claim 1 wherein said first and second transistors each have a base, emitter and collector electrode, the base electrode of said first transistor is connected to the first output terminal of said generator means and wherein the base and collector electrodes of said second transistor are coupled together and connected to the second output terminal of said generator means and said emitter electrodes are connected at said fixed reference potential.

* * * * *